(12) United States Patent
Kim

(10) Patent No.: US 11,418,085 B2
(45) Date of Patent: Aug. 16, 2022

(54) MOTOR FOR ELECTRIC POWER STEERING AND SENSING DEVICE

(71) Applicant: LG INNOTEK CO., LTD., Seoul (KR)

(72) Inventor: Byeong Yong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 105 days.

(21) Appl. No.: 16/964,837

(22) PCT Filed: Jan. 30, 2019

(86) PCT No.: PCT/KR2019/001280
§ 371 (c)(1),
(2) Date: Jul. 24, 2020

(87) PCT Pub. No.: WO2019/151766
PCT Pub. Date: Aug. 8, 2019

(65) Prior Publication Data
US 2021/0066989 A1 Mar. 4, 2021

(30) Foreign Application Priority Data

Feb. 1, 2018 (KR) .................. 10-2018-0012891

(51) Int. Cl.
*H02K 11/21* (2016.01)
*H02K 5/16* (2006.01)
(Continued)

(52) U.S. Cl.
CPC ........... *H02K 5/161* (2013.01); *H02K 1/2786* (2013.01); *H02K 5/15* (2013.01); *H02K 11/21* (2016.01); *B62D 5/0409* (2013.01)

(58) Field of Classification Search
CPC ........ H02K 5/161; H02K 1/2786; H02K 5/15; H02K 11/21; H02K 5/1732; H02K 7/083; B62D 5/0409; B62D 5/0403
See application file for complete search history.

(56) References Cited

U.S. PATENT DOCUMENTS 6,144,130 A 11/2000 Kawamura
6,396,190 B1 5/2002 Ahn et al.
(Continued)

FOREIGN PATENT DOCUMENTS

CN 1189001 A 7/1998
CN 103921837 A 7/2014
(Continued)

OTHER PUBLICATIONS

International Search Report dated May 8, 2019 issued in Application No. PCT/KR2019/001280.
(Continued)

*Primary Examiner* — Terrance L Kenerly
(74) *Attorney, Agent, or Firm* — Ked & Associates, LLP

(57) ABSTRACT

The present invention may provide a motor including a housing coupled to a first bearing, a stator disposed in the housing, a rotor disposed in the stator, and a shaft coupled to the rotor, wherein the housing includes a body and a first pocket formed to be bent from one side of the body toward an inner side of the housing, the first pocket includes an extended part bent from the one side of the body and a first support part bent from the extended part, the first pocket includes a first opening formed by one side of the extended part adjacent to the one side of the body and a second opening formed by the first support part, and a size of the first opening is greater than a size of the second opening.

12 Claims, 5 Drawing Sheets

(51) Int. Cl.
H02K 1/2786 (2022.01)
H02K 5/15 (2006.01)
B62D 5/04 (2006.01)

(56) References Cited

U.S. PATENT DOCUMENTS

| | | | | |
|---|---|---|---|---|
| 2006/0138883 | A1* | 6/2006 | Yagai | H02K 3/522 |
| | | | | 310/71 |
| 2008/0211332 | A1* | 9/2008 | Kataoka | H02K 7/083 |
| | | | | 310/71 |
| 2010/0001605 | A1 | 1/2010 | Tajima et al. | |
| 2013/0257194 | A1 | 10/2013 | Yamasaki | |
| 2017/0338713 | A1* | 11/2017 | Tomizawa | H02K 5/06 |
| 2019/0248406 | A1* | 8/2019 | Kaneko | H02K 5/15 |

FOREIGN PATENT DOCUMENTS

| | | |
|---|---|---|
| JP | 10-210691 | 8/1998 |
| JP | 2002-078258 | 3/2002 |
| JP | 2010-016958 | 1/2010 |
| JP | 2010-178469 | 8/2010 |
| KR | 10-2001-0026802 | 4/2001 |

OTHER PUBLICATIONS

Chinese Office Action dated Jan. 17, 2022 issued in Application 201980011052.X.

* cited by examiner

[FIG. 1]
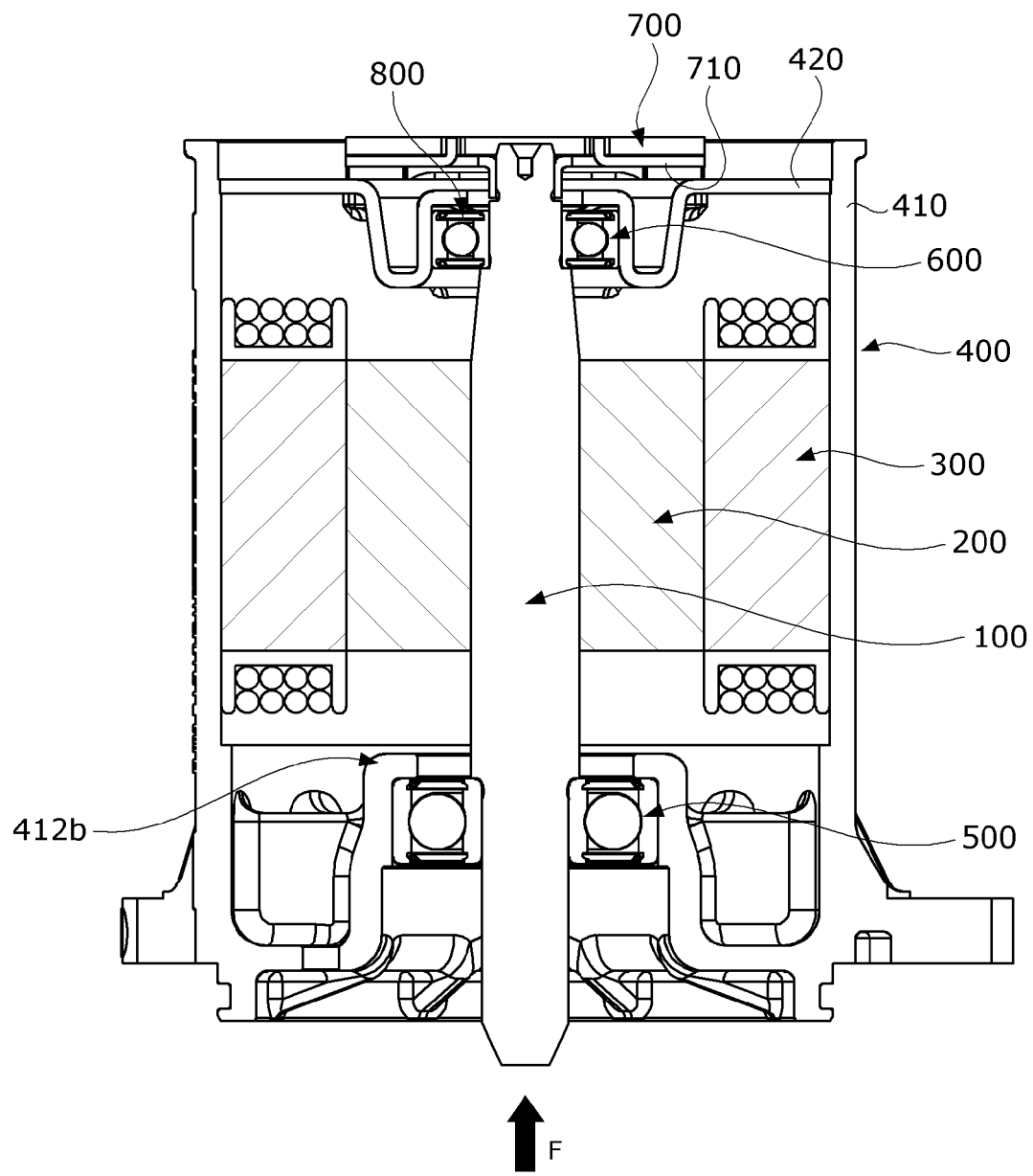

[FIG. 2]
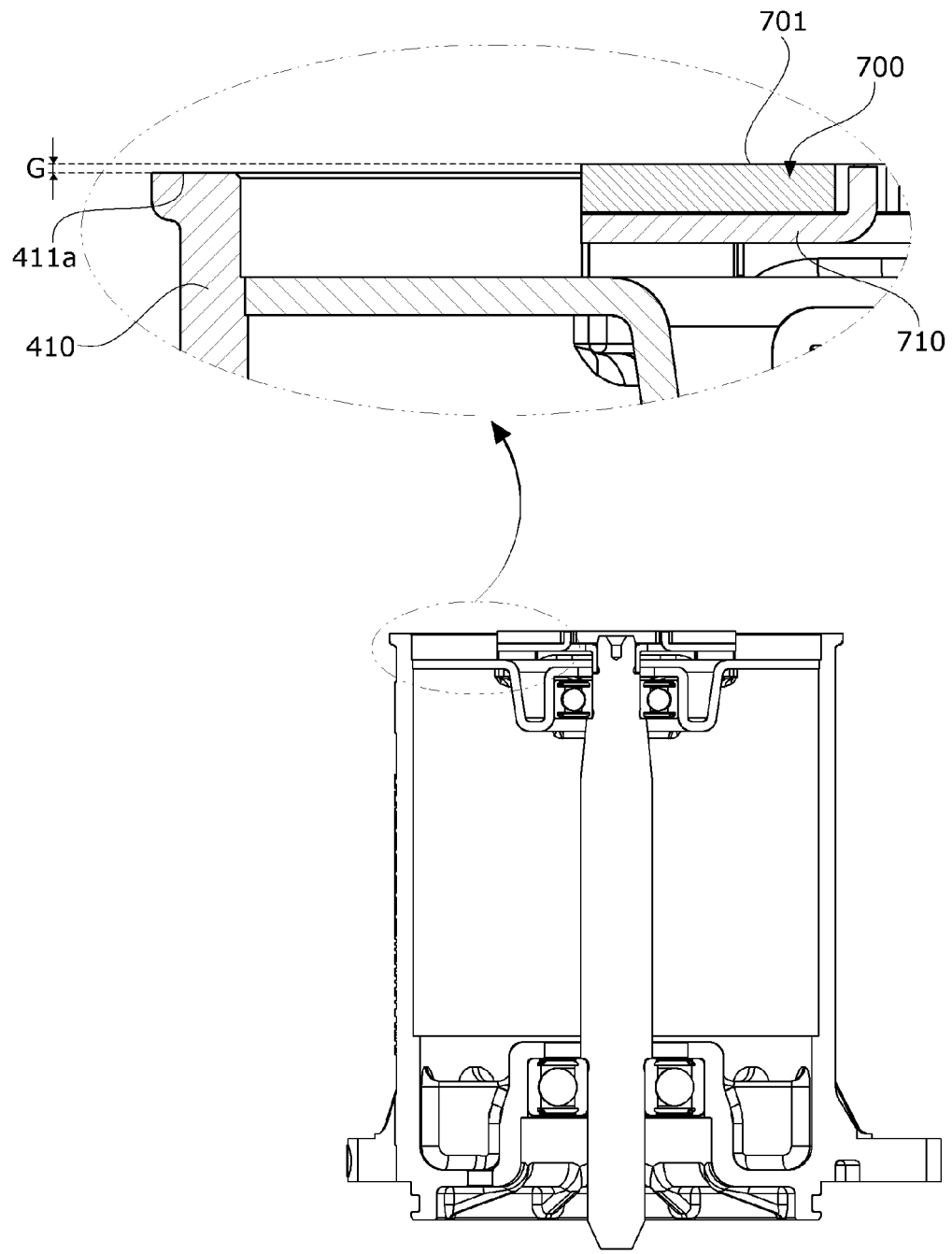

[FIG. 3]
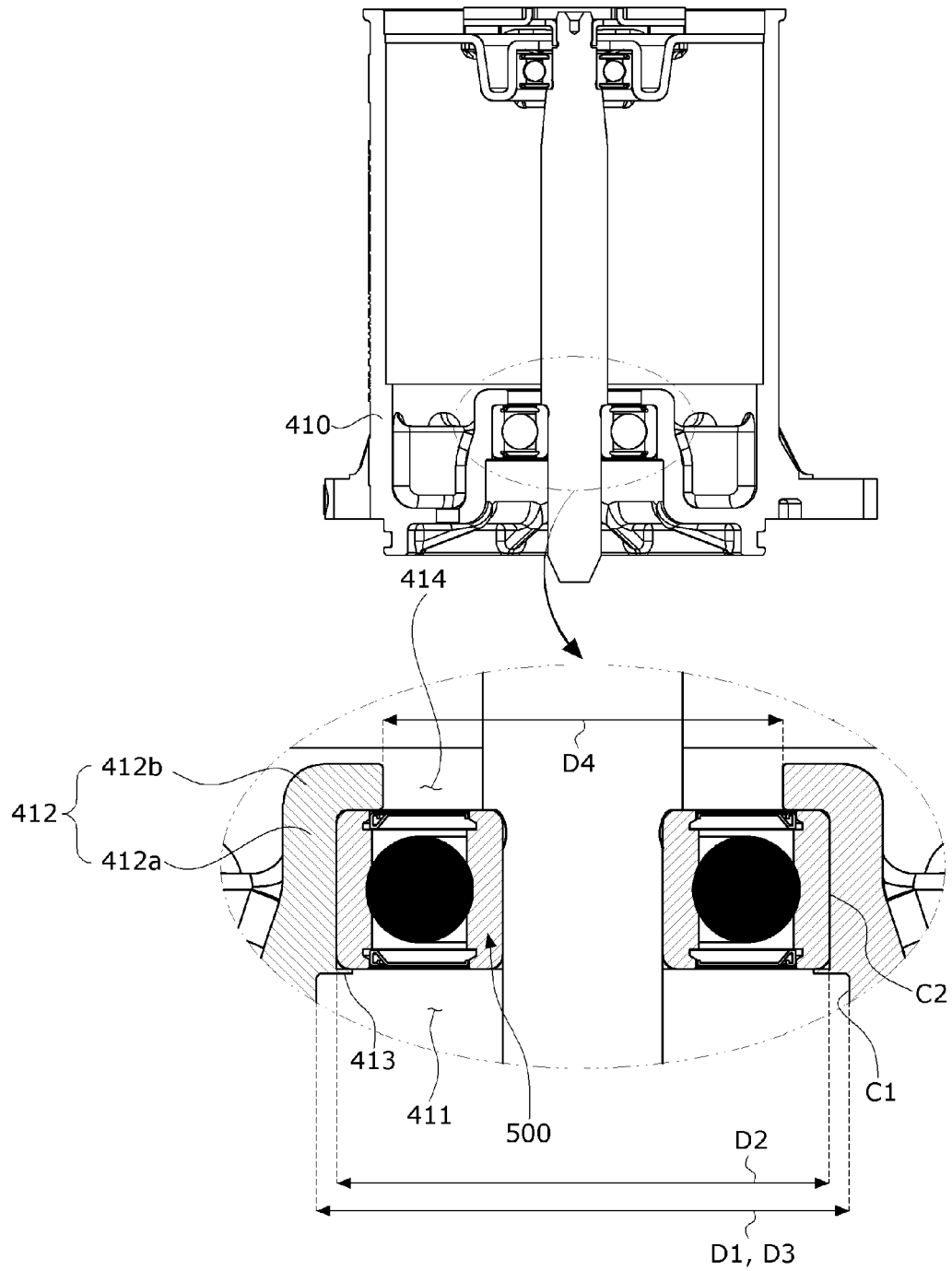

[FIG. 4]
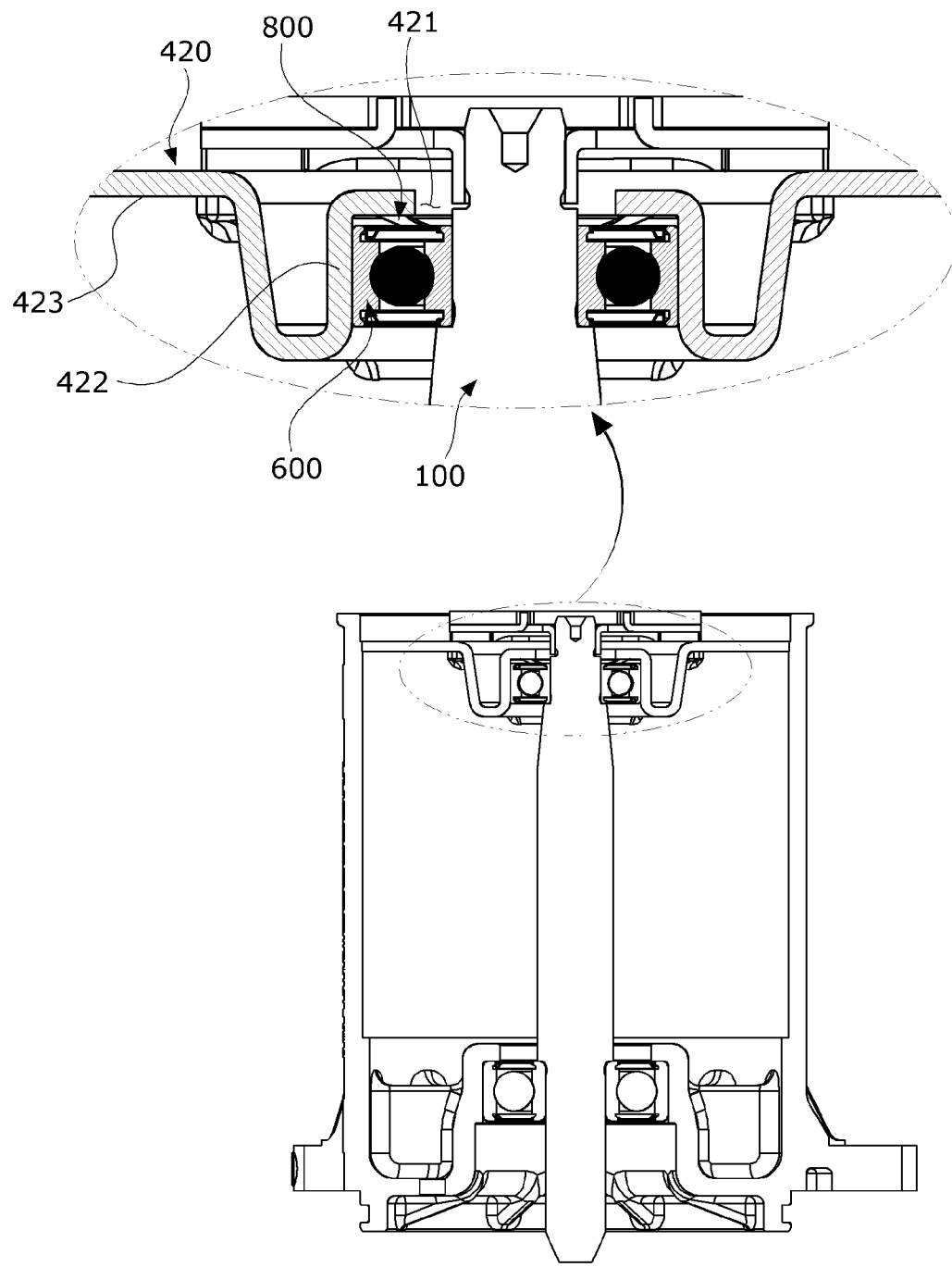

[FIG. 5]　411->411a
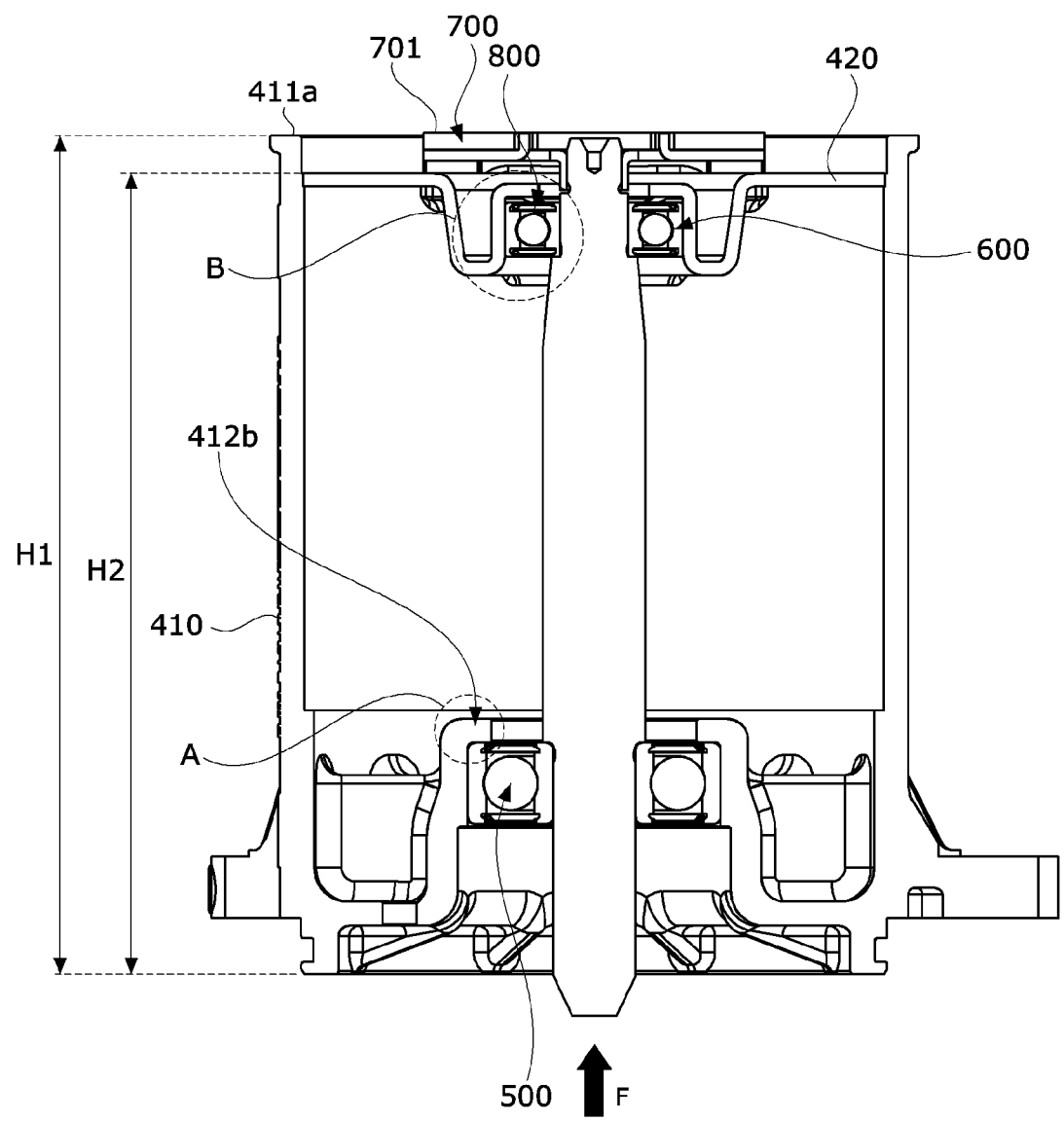

US 11,418,085 B2

MOTOR FOR ELECTRIC POWER STEERING AND SENSING DEVICE

CROSS-REFERENCE TO RELATED PATENT APPLICATIONS

This application is a U.S. National Stage Application under 35 U.S.C. § 371 of PCT Application No. PCT/KR2019/001280, filed Jan. 30, 2019, which claims priority to Korean Patent Application No. 10-2018-0012891, filed Feb. 1, 2018, whose entire disclosures are hereby incorporated by reference.

TECHNICAL FIELD

The present invention relates to a motor.

BACKGROUND ART

Electronic power steering (EPS) systems secure turning stability of vehicles and provide quick reinforcing force so that drivers can stably drive. Such an EPS system uses an electronic control unit (ECU) to drive a motor according to driving conditions detected by a speed sensor, a torque angle sensor, a torque sensor, and the like so as to control operation of a steering shaft of a vehicle.

A motor of an EPS system includes a shaft, a rotor, and a stator. The rotor and the stator are included in a housing. The housing may be divided into a body and a cover. Bearings rotatably supporting the shaft may be included in the body and the cover. In addition, a sensing magnet which is a device configured to detect a position of the rotor may be disposed in the motor. The sensing magnet is coupled to an upper end of the shaft. Meanwhile, an axial load of an external device may be transmitted through a lower end of the shaft.

When the axial load is applied to the shaft, a position of the sensing magnet may be changed due to deformation of the housing, the bearing, or the shaft. Particularly, while the motor is coupled to an application part, a position of an upper end of the housing and a position of an upper surface of the sensing magnet should be aligned with each other and managed within a predetermined tolerance, but when the axial load is applied to the shaft, there is a problem in that the position of the sensing magnet is changed so that it is difficult to manage the tolerance.

Technical Problem

The present invention is directed to providing a motor in which a change in position of a sensing magnet due to an axial load is prevented.

Technical Solution

One aspect of the present invention provides a motor including a housing coupled to a first bearing, a stator disposed in the housing, a rotor disposed in the stator, and a shaft coupled to the rotor, wherein the housing includes a body and a first pocket formed to be bent from one side of the body toward an inner side of the housing, the first pocket includes an extended part bent from the one side of the body and a first support part bent from the extended part, the first pocket includes a first opening formed by one side of the extended part adjacent to the one side of the body and a second opening formed in the first support part, and a size of the first opening is greater than a size of the second opening.

The extended part may include a step region, the first pocket may include a first cavity and a second cavity which are divided by the step region, and a diameter of the first cavity may be greater than a diameter of the second cavity.

The second cavity may be disposed between the first support part and the first cavity.

The diameter of the second cavity may be less than a diameter of the first opening and greater than a diameter of the second opening.

The first bearing may be inserted through the first opening and disposed in the second cavity.

A lateral cross-sectional shape of the first pocket may be a circular shape, and centers of the first opening and the second opening may be collinear with a center of the shaft.

The motor may further include a cover disposed at one side of the housing and coupled to a second bearing, and a sensing magnet disposed above the cover, wherein the cover may include a plate and a second pocket formed to be bent from an inner side of the plate, and may further include a second support part disposed between an upper portion of the second pocket and the second bearing, the second pocket may be in contact with an outer circumferential surface and an upper surface of an outer wheel of the second bearing, and the second support part may be a washer.

The first bearing may be prevented from being separated toward the cover by the first support part.

The first pocket of the housing may include a caulking portion protruding from an inner side surface of the first pocket to be in contact with a lower surface of an outer wheel of the first bearing.

The first bearing may be disposed outside the housing, and the second bearing may be disposed inside the housing.

Advantageous Effects

According to embodiments, an advantageous effect is provided in which a change in position of a sensing magnet is prevented even when an axial load is applied to a shaft.

DESCRIPTION OF DRAWINGS

FIG. 1 is a view illustrating a motor according to an embodiment.

FIG. 2 is a view illustrating a tolerance between a position of an upper end of a body of a housing and a position of an upper surface of a sensing magnet.

FIG. 3 is a view illustrating a first pocket and a first bearing of the body.

FIG. 4 is a view illustrating a second pocket and a second bearing of a cover.

FIG. 5 is a view illustrating a portion bearing an axial load.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. In addition, terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In addition, in the description of the invention, when it is determined that detailed descriptions of related well-known functions unnecessarily obscure the gist of the invention, the detailed descriptions thereof will be omitted.

FIG. 1 is a view illustrating a motor according to an embodiment.

Referring to FIG. 1, the motor according to the embodiment may include a shaft 100, a rotor 200, a stator 300, and a housing 400.

The shaft 100 may be coupled to the rotor 200. When a current is supplied, an electrical interaction occurs between the rotor 200 and the stator 300, the rotor 200 is rotated, and the shaft 100 is rotated in conjunction with the rotor 200. The shaft 100 may be connected to a steering shaft of a vehicle and may transmit power to the steering shaft.

The rotor 200 is rotated due to the electrical interaction with the stator 300.

The rotor 200 may include a rotor core and a magnet. The rotor core may be formed to have a shape in which a plurality of circular steel plates are stacked or formed to have one cylindrical shape. A hole to which the shaft 100 is coupled may be disposed at a center of the rotor core. A protrusion for guiding the magnet may protrude from an outer circumferential surface of the rotor core. The magnet may be attached to the outer circumferential surface of the rotor core. A plurality of magnets may be disposed along a circumference of the rotor core at predetermined intervals. The rotor 200 may include a can member which fixedly surrounds the magnets so that the magnets are not separated from the rotor core and the magnets are prevented from being exposed.

A coil may be wound around the stator 300 to induce an electrical interaction with the rotor 200. A specific structure of the stator 300 around which the coil is wound will be described below. The stator 300 may include a stator core including a plurality of teeth. An annular yoke portion is provided and the teeth around which the coil is wound from a yoke toward a center thereof may be provided in the stator core. The teeth may be provided along an outer circumferential surface of the yoke portion at predetermined intervals. Meanwhile, the stator core may be provided as a plurality of thin steel plates which are stacked. In addition, the stator core may be provided as a plurality of divided cores which are coupled or connected.

The housing 400 may accommodate the rotor 200 and the stator 300. The housing 400 includes a body 410 and a cover 420. The body 410 has a shape of which an upper portion is open. The cover 420 covers the open upper portion of the body 410.

A first bearing 500 is disposed in the body 410. The first bearing 500 rotatably supports a lower portion of the shaft 100.

A second bearing 600 is disposed on the cover 420. The second bearing 600 rotatably supports an upper portion of the shaft 100.

A sensing magnet 700 is coupled to the shaft 100 to operate in conjunction with the rotor 200. The sensing magnet 700 is a device for detecting a position of the rotor 200. A substrate, on which a Hall sensor detects a change in magnetic flux of the sensing magnet 700, may be provided in an application part in which the motor is installed.

FIG. 2 is a view illustrating a tolerance between a position of an upper end of a body of the housing and a position of an upper surface of the sensing magnet.

Referring to FIGS. 1 and 2, the sensing magnet 700 is disposed above the cover 420. A sensing plate 710 is coupled to an upper end of the shaft 100 which passes through the cover 420 and protrudes upward from the cover 420. In addition, the sensing magnet 700 is seated on an upper surface of the sensing plate 710. The substrate on which the Hall sensor is disposed may be disposed above the sensing magnet 700. The substrate is disposed in the application part in which the motor is installed.

In this case, the cover 420 is disposed inside the body 410 in consideration of a coupling relationship between the motor and the application part. A height H2 (see FIG. 5) from a lower surface of the body 410 to an upper surface of the cover 420 is less than a height H1 (see FIG. 5) from the lower surface of the body 410 to an upper end 411a of the body 410.

In addition, a distance from an upper surface 701 of the sensing magnet 700 to the Hall sensor is determined in consideration of a position of the upper end 411a of the body 410. The position of the upper end 411a of the body 410 and a position of the upper surface 701 of the sensing magnet 700 should be managed within a reference tolerance G in an axial direction. For example, the reference tolerance G may be within 0.4 mm in an upward direction and within 0.12 mm in a downward direction with respect to the position of the upper end 411a of the body 410. A position of the sensing magnet 700 which satisfies the reference tolerance G is a very important factor in securing performance of the motor.

When the motor operates, a load F may be applied to the shaft 100 in the axial direction like a load F of FIG. 1. When the load F is applied to the shaft 100 as illustrated in the drawing, the position of the sensing magnet 700 may be changed due to a cumulative tolerance of the bearing, the housing, and the shaft 100. The motor according to the embodiment is provided to prevent a change in the position of the sensing magnet 700 using a first support part 412b and a second support part 800.

FIG. 3 is a view illustrating a first pocket and the first bearing of the body.

Referring to FIG. 3, the body 410 includes a first opening 411 and a second opening 414 in a bottom surface thereof. The shaft 100 passes through the first opening 411 and the second opening 414. A lower end of the shaft 100 passing through the first opening 411 and the second opening 414 is a portion to which an axial load of an external device is applied. In addition, the body 410 incudes a first pocket 412. The first pocket 412 is disposed along a circumference of the first opening 411. The first pocket 412 may have a shape in which the bottom surface of the body 410 is recessed upward. The first pocket 412 accommodates the first bearing 500. The first bearing 500 is disposed outside the body 410.

The first pocket 412 includes an extended part 412a and a first support part 412b. The extended part 412a is bent and extends from one side of the body 410. The first support part 412b is bent from the extended part 412a toward the shaft 100. The first opening 411 is a region formed by one side of the extended part 412a. The second opening 414 is a region formed by the first support part 412b.

The first support part 412b covers at least an upper surface of an outer wheel of the first bearing 500. Accordingly, in a case in which the load F is applied upward to the shaft 100 in the axial direction, the first support part 412b fixes the first bearing 500 such that the shaft 100 is not moved upward. In addition, the first bearing 500 is prevented from being separated toward the cover by the first support part 412b.

Meanwhile, the first pocket 412 includes a caulking portion 413 protruding from an inner wall thereof. The caulking portion 413 is in contact with a lower surface of the outer wheel of the first bearing 500 to fix the first bearing 500 so that the first bearing 500 is not withdrawn downward from the first pocket 412. The caulking portion 413 is formed by caulking a part of the inner wall of the first pocket 412.

The extended part 412a includes a step region. The first pocket 412 may include a first cavity C1 and a second cavity C2 divided by the step region. In this case, a diameter D1 of the first cavity C1 may be greater than a diameter D2 of the second cavity C2. The second cavity C2 may be disposed between the first cavity C1 and the first support part 412b. The first bearing 500 may be inserted through the first opening 411 and disposed in the second cavity C2.

A diameter D3 of the first opening 411 is greater than a diameter D4 of the second opening 414. In addition, the diameter D2 of the second cavity C2 is less than the diameter D3 of the first opening 411 and greater than the diameter D4 of the second opening 414.

A lateral cross-sectional shape of the first pocket 412 may be a circular shape. Centers of the first opening 411 and the second opening 414 are collinear with a center of the shaft 100.

FIG. 4 is a view illustrating a second pocket and the second bearing of the cover.

Referring to FIG. 4, the cover 420 includes a third opening 421 at a center thereof. The shaft 100 passes through the third opening 421. In addition, the cover 420 includes a second pocket 422 and a plate 423. The second pocket 422 is formed to be bent from an inner side of the plate 423. The second pocket 422 is disposed along a circumference of the third opening 421. The second pocket 422 accommodates the second bearing 600. The second bearing 600 is disposed inside the cover 420. The second pocket 422 is in contact with an outer circumferential surface and an upper surface of an outer wheel of the second bearing 600.

A second support part 800 is disposed between an upper portion of the second pocket 422 and the second bearing 600. The second support part 800 may be a wave washer. The second support part 800 elastically supports the second bearing 600 in a direction in which the shaft moves upward.

FIG. 5 is a view illustrating a portion bearing an axial load.

Referring to FIG. 5, when the load F is applied upward in the axial direction, the second support part 800 first bears the load F. Like region A of FIG. 5, since a vicinity of the lower end of the shaft 100, to which the load F is applied, bears the load F, an influence of the load applied to the upper end of the shaft 100 above which the sensing magnet 700 is positioned may be minimized. The first support part 412b first bears the load F, and the second support part 800 second bears the load F elastically. Since region B of FIG. 5 is close to the position of the sensing magnet 700, the position of the sensing magnet 700 may be significantly changed due to deformation of the second pocket 422 and the second bearing 600.

In the motor according to the embodiment, since the first support part 412b bearing the load F is provided at a position disposed maximally away from the sensing magnet 700 like the region A of the FIG. 5, deformation of the second pocket 422 and the second bearing 600 is minimized to prevent a change in the position of the sensing magnet 700.

Meanwhile, an outer diameter of the first bearing 500 is greater than an outer diameter of the second bearing 600. This is to increase a bearing force for the load F in a vicinity of the first pocket 412 disposed far away from the sensing magnet 700.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope, and the technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a housing coupled to a first bearing;
a stator disposed in the housing;
a rotor disposed in the stator;
a shaft coupled to the rotor, and the shaft to extend in an axial direction from a first end to a second end; and
a sensing magnet coupled to the shaft,
wherein the housing includes a body and a cover,
wherein the body includes a first pocket in which the first bearing is disposed,
wherein the cover includes a second pocket in which a second bearing is disposed,
wherein the first pocket includes an extended part bent from one side of the body and a first support part bent from the extended part so that the first support part is in contact with an upper surface of an outer wheel of the first bearing,
wherein a height from a lower surface of the body to an upper surface of the cover is less than a height from the lower surface of the body to an upper end of the body,
wherein the sensing magnet is disposed on the upper surface of the cover,
wherein the sensing magnet is disposed above the cover, and the sensing magnet is closer to the second end of the shaft than the first end of the shaft,
wherein an upper surface of the sensing magnet is higher than the upper end of the body in the axial direction.

2. The motor of claim 1, wherein:
the extended part includes a step region;
the first pocket includes a first cavity and a second cavity which are divided by the step region;
a diameter of the first cavity is greater than a diameter of the second cavity,
the first pocket includes a first opening formed by one side of the extended part adjacent to the one side of the body and a second opening formed by the first support part, and
a size of the first opening is greater than a size of the second opening.

3. The motor of claim 2, wherein the second cavity is disposed between the first support part and the first cavity.

4. The motor of claim 3, wherein the diameter of the second cavity is less than a diameter of the first opening and greater than the diameter of the second opening.

5. The motor of claim 2, wherein the first bearing is inserted through the first opening and is disposed in the second cavity.

6. The motor of claim 2, wherein:
a lateral cross-sectional shape of the first pocket is a circular shape; and
centers of the first opening and the second opening are collinear with a center the shaft.

7. The motor of claim 1,
wherein the cover includes a second support part disposed between an upper portion of the second pocket and the second bearing,
the second pocket is in contact with an outer circumferential surface and an upper surface of an outer wheel of the second bearing, and
the second support part includes a washer.

8. The motor of claim 7, wherein the first bearing is prevented from being separated toward the cover by the first support part.

9. The motor of claim 1, wherein the first pocket of the housing includes a caulking portion protruding from an inner side surface of the first pocket to be in contact with a lower surface of the outer wheel of the first bearing.

10. The motor of claim 7, wherein:
the first bearing is disposed outside the housing; and
the second bearing is disposed inside the housing,
a load is applied upward to the shaft in the axial direction.

11. A motor comprising:
a housing coupled to a first bearing;
a stator disposed in the housing;
a rotor disposed in the stator;
a shaft coupled to the rotor; and
a sensing magnet coupled to the shaft,
wherein the housing includes a body and a cover,
wherein the body includes a first pocket in which the first bearing is disposed,
wherein the cover includes a second pocket in which a second bearing is disposed,
wherein the first pocket includes an extended part bent from one side of the body and a first support part bent from the extended part so that the first support part is in contact with an upper surface of an outer wheel of the first bearing,
wherein a height from a lower surface of the body to an upper surface of the cover is less than a height from the lower surface of the body to an upper end of the body,
wherein the sensing magnet is disposed on the upper surface of the cover,
wherein the sensing magnet is disposed above the cover,
wherein the first pocket of the housing includes a caulking portion protruding from an inner side surface of the first pocket to be in contact with a lower surface of the outer wheel of the first bearing.

12. A motor comprising:
a housing coupled to a first bearing;
a stator disposed in the housing;
a rotor disposed in the stator;
a shaft coupled to the rotor; and
a sensing magnet coupled to the shaft,
wherein the housing includes a body and a cover,
wherein the body includes a first pocket in which the first bearing is disposed,
wherein the cover includes a second pocket in which a second bearing is disposed,
wherein the first pocket includes an extended part bent from one side of the body and a first support part bent from the extended part so that the first support part is in contact with an upper surface of an outer wheel of the first bearing,
wherein a height from a lower surface of the body to an upper surface of the cover is less than a height from the lower surface of the body to an upper end of the body,
wherein the sensing magnet is disposed on the upper surface of the cover,
wherein the sensing magnet is disposed above the cover,
wherein the cover includes a second support part disposed between an upper portion of the second pocket and the second bearing,
the second pocket is in contact with an outer circumferential surface and an upper surface of an outer wheel of the second bearing, and
the second support part includes a washer,
wherein:
the first bearing is disposed outside the housing; and
the second bearing is disposed inside the housing,
a load is applied upward to the shaft in an axial direction.

* * * * *